(12) United States Patent  (10) Patent No.: US 6,738,869 B1
Moran et al.  (45) Date of Patent: May 18, 2004

(54) ARRANGEMENTS FOR OUT-OF-ORDER QUEUE CACHE COHERENCY AND MEMORY WRITE STARVATION PREVENTION

(75) Inventors: Douglas R. Moran, Beaverton, OR (US); Thomas C. Brown, Portland, OR (US); Kenneth B. Oliver, Newberg, OR (US)

(73) Assignee: Intel Corporation, Santa Clara, CA (US)

( * ) Notice: Subject to any disclaimer, the term of this patent is extended or adjusted under 35 U.S.C. 154(b) by 730 days.

(21) Appl. No.: 09/649,513

(22) Filed: Aug. 29, 2000

(51) Int. Cl.[7] ................................................. C06F 12/00
(52) U.S. Cl. ........................................ 711/145; 711/144
(58) Field of Search ................................. 711/145, 144, 711/156, 163, 151, 158

(56) References Cited

U.S. PATENT DOCUMENTS 5,615,334 A * 3/1997 Wang et al. ................. 711/145
5,617,556 A * 4/1997 Baumgartner et al. ...... 711/118
5,623,628 A * 4/1997 Brayton et al. ............... 710/39

* cited by examiner

Primary Examiner—Matthew Kim
Assistant Examiner—Matthew D. Anderson
(74) Attorney, Agent, or Firm—Jeffrey B. Huter

(57) ABSTRACT

Arrangements for maintaining out-of-order queue cache coherency and for prevention of memory write starvation.

16 Claims, 9 Drawing Sheets

US 6,738,869 B1

ARRANGEMENTS FOR OUT-OF-ORDER QUEUE CACHE COHERENCY AND MEMORY WRITE STARVATION PREVENTION

FIELD

The invention relates to arrangements for maintaining out-of-order queue cache coherency and for prevention of memory write starvation.

BACKGROUND

In order to achieve computing systems with greater versatility and speeds, systems have been derived (see FIG. 1, e.g., described ahead) where there are a plurality of processors each having a cache associated therewith. In addition, there may be one or more integrated circuits (ICs) interfacing with, and controlling access to, main system memory. Such computing systems may support out-of-order handling of memory requests. When such computing systems have a plurality of processings ongoing at any given time, with multiple "cached" copies of memory portions co-existing throughout the system at any given time and with a plurality of processors and other devices competing for memory accesses, at least two problems can arise, i.e., memory incoherency and memory write starvation. Both problems can result in erroneous system operation.

Regarding incoherency, if multiple sources within the system store incoherent (e.g., unmatched) data having differing values, any number of erroneous operations can occur. For example, a copy of an updated and correct memory portion existing somewhere within the system, has the danger of being erroneously overwritten or superceded by older, outdated and erroneous memory portion. In addition, if multiple sources attempt to respond to a memory read request and simultaneously output incoherent copies of a memory portion, a clash may occur when the multiple sources simultaneously attempt to drive differing values onto a common data bus. Data corruption and/or system error/lockup are distinct possibilities.

Regarding memory write starvation, conditions may exist where a memory write necessary for subsequent computing operations is never able to be written to memory, and thus the system may enter an endless loop situation.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto. The spirit and scope of the present invention are limited only by the terms of the appended claims.

The following represents brief descriptions of the drawings, wherein.

DETAILED DESCRIPTION

Figure 1:
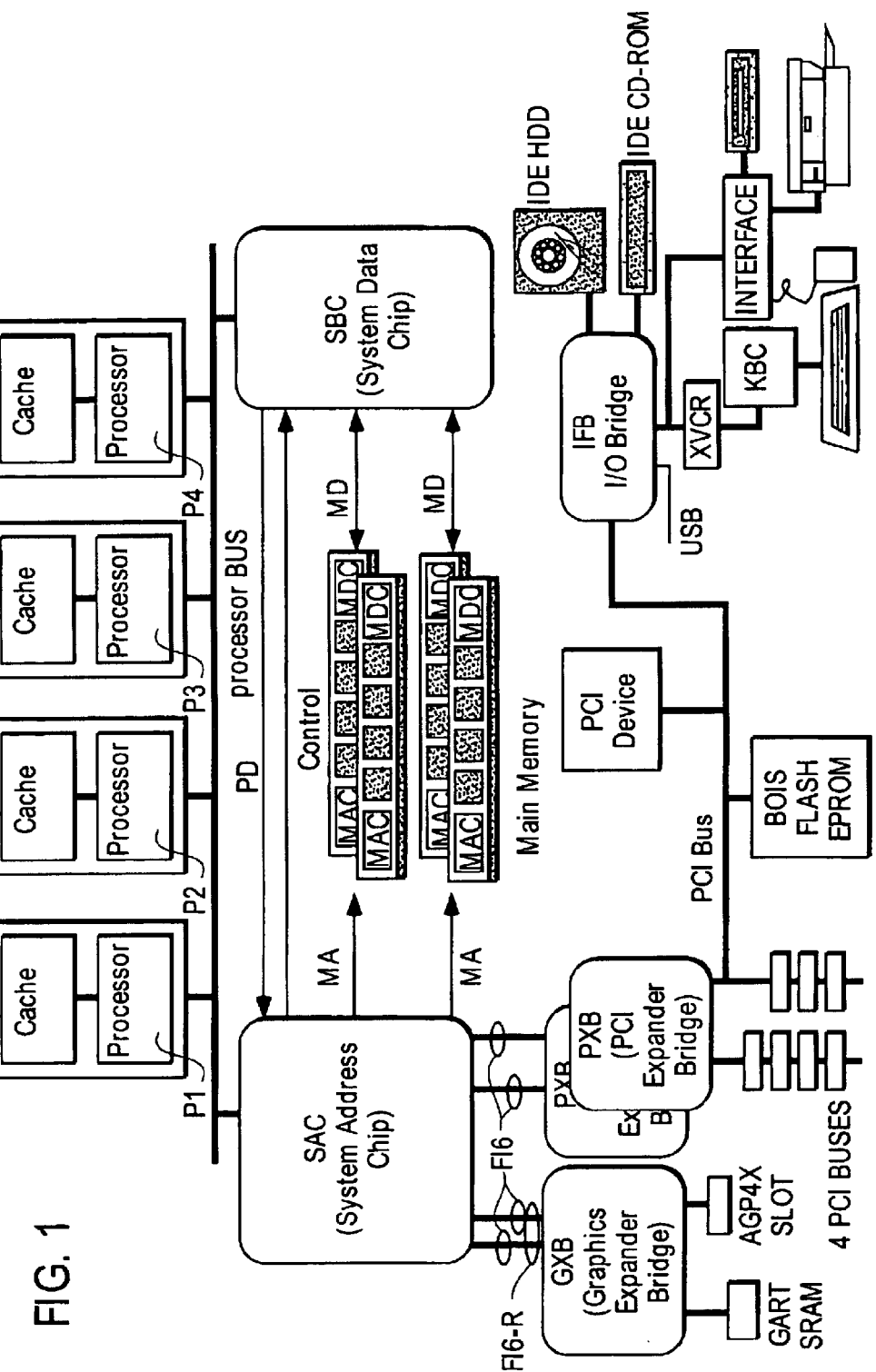
FIG. 1 is block diagram of an example system useful in an understanding of example embodiments of the invention.

Before beginning a detailed description of the subject invention, mention of the following is in order. When appropriate, like reference numerals and characters may be used to designate identical, corresponding or similar components in differing figure drawings. Further, in the detailed description to follow, example sizes/models/values/ranges may be given, although the present invention is not limited thereto. Still further, the clock and/or timing signal FIGS. are not drawn to scale, and instead, exemplary and critical time values are mentioned when appropriate. With regard to description of any timing signals, the terms assertion and de-assertion may be used in an intended generic sense. More particularly, such terms are used to avoid confusion when working with a mixture of "active-low" and "active-high" signals, and to represent the fact that the invention is not limited to the illustrated/described signals, but could be implemented with a total/partial reversal of any of the "active-low" and "active-high" signals by a simple change in logic. More specifically, the term "assert" indicates that a signal is active independent of whether that level is represented by a high or low voltage, while the terms "de-assert" indicates that a signal is inactive. As a final note, well known power/ground connections to ICs and other components may not be shown within the FIGS. for simplicity of illustration and discussion, and so as not to obscure the invention.

Although example embodiments of the present invention will be described using the FIG. 1 example computing system, practice of the invention is not limited thereto, i.e., the invention may be able to be practiced with other types or arrangements of computing systems. Turning now to FIG. 1, such FIG. 1 illustrates a collection of chips (e.g., including a chipset) and components which implement a mid-to-high end server platform. Shown are a plurality of processors P1–P4, a plurality of caches C1–C4, a System Address Chip SAC and a System Data Chip SDC all arranged with respect to a front side bus FSB or processor BUS. Further shown is a Main Memory subsystem arranged between, and accessed by, the SAC/SDC pair of integrated circuit (IC) chips.

The System Address Component SAC is one central component of a chipset, and connects to the address and control sections of the front side bus FSB, and is responsible for translating and directing FSB accesses to an appropriate F16 bus or to memory. It also acts as a routing agent for inbound traffic, directing traffic to a peer F16 bus, memory or the FSB. The System Data Component SDC connects not only to the data signals on the FSB, but also to the memory subsystem and the SAC (e.g., via private bus PD and Control lines). The data for all transfers passes through the SDC, whether from the FSB to memory, from F16 to memory or peer to peer F16. The connection between the SAC and SDC allows for concurrent data transfers to the FSB and to the F16 buses. This maximizes the available bandwidth to each system agent.

Within the Main Memory subsystem, a Memory Address Component MAC on memory cards receives signals on memory address MA lines, and translates memory cycles issued by the SAC into a protocol required by memory chips (e.g., dynamic random access memories DRAM'S). For example, at minimum, the MAC creates typical row access strobe RAS and column access strobe CAS control signals for the memory array, as well as providing address multiplexing functions. There can be multiple MAC's per memory card. The Memory Data Component MDC on the memory cards acts as a routing agent between the SDC and data pins of the memory array, i.e., with respect to data signals provided on memory data MD lines. The MDC multiplexes data going into the SDC to select a proper data path for data coming from the memory array, and provides a distribution network for data being delivered to the memory. There may be multiple MDCs per memory card.

Turning now to additional example components attached to the SAC via ones of a plurality of busses F16, a Peripheral Computer Interconnect PCI expansion Bridge (PXB) may provide a bus protocol bridging function between the F16 bus and a PCI bus. A single PXB may connect to one F16 bus and may create multiple busses, e.g., two 33 Mhz, 32 bit PCI buses. A strapping option may allow for the PXB to optionally support a single 64 bit PCI bus, and there may multiple PXBs within the system, e.g., from 1 to 4 PXBs. Additional components (not of interest to the understanding of the present disclosure) may be arranged in association with the PCI bus, e.g., a BIOS FLASH EPROM, PCI Device, an interface bridge IFB acting as an input/output I/O bridge, Integrated Device Electronics hard-disk-drive IDE HDD, IDE CD-ROM, universal serial bus USB, etc.

In moving to yet an additional branch connected to the SAC, a Graphics eXpansion Bridge GXB provides a bus protocol bridging function between another F16 bus arrangement and an Accelerated Graphics Port AGP. The addition of the GXB to the FIG. 2 system allows such system to address a mid-to-high end workstation market segment by adding a high performance, dedicated graphics port.

Figure 2:
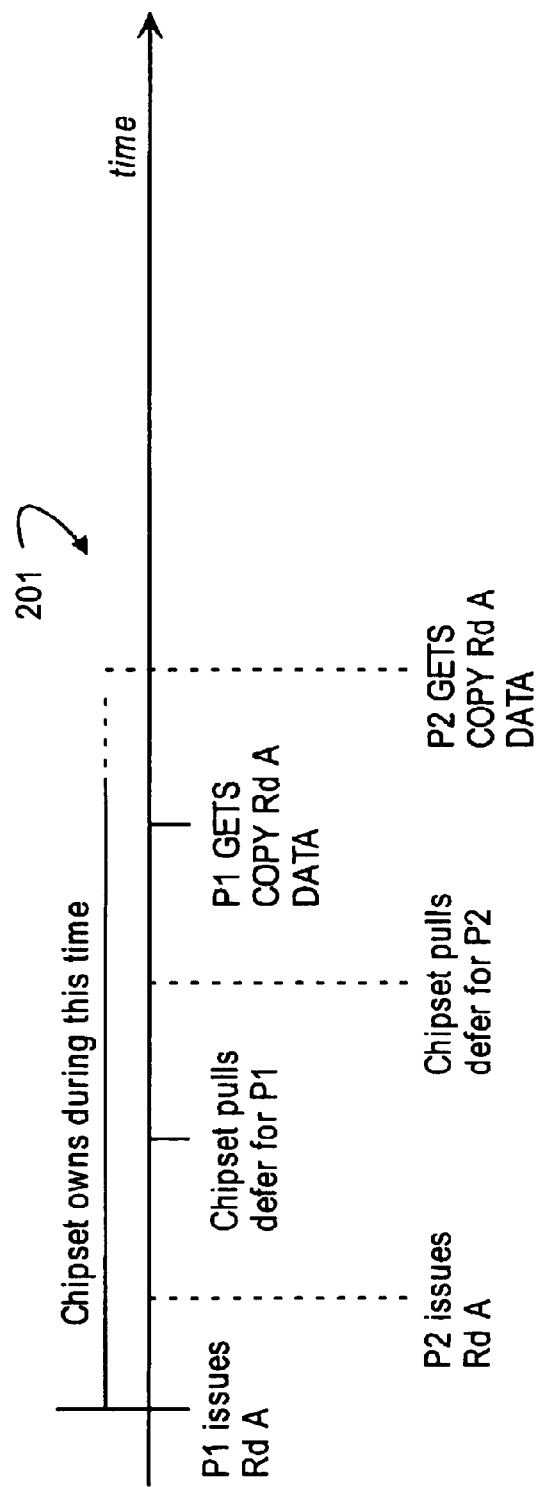
FIG. 2 is an example time-line diagram illustrating an example of a situation having potential for cache incoherency.

Turning now to more specific discussions regarding the invention, as alluded to previously, the SAC/SDC chipset controls memory accesses. FIG. 2 has an example time-line diagram 201 illustrating an example of a situation having a potential for an occurrence of cache incoherency. More particularly, in reading the FIG. 2 time-line diagram from left to right, at some predetermined time, a processor P1 issues a read request Rd A to request a read of a memory portion A (e.g., a cache line). Shortly thereafter, a second processor P2 itself issues a similar read request Rd A to read the same memory portion A.

The SAC/SDC chipset may be adapted to "defer" such requests temporarily as it may need a predetermined time in order to first perform predetermined set up operations/procedures before servicing any memory request. Accordingly, as shown in FIG. 2, the SAC/SDC chipset pulls a defer first for PI, and shortly thereafter, pulls a defer for P2. Thereafter, first the processor P1 receives a copy of the memory portion A data, and then the processor P2 likewise receives a copy. The problem with this arrangement is that if processors P1 and P2 now each have a copy of the memory portion A data without either having "ownership" of such data, one or both of such processors P1 and P2 may thereafter modify its own copy of the memory portion A data such that incoherent (unmatched) copies of the memory portion A data exist within the system.

For any computing system, data coherency between processor caches and other elements within the system must be one of the main concerns of the system designer. In a symmetric multiprocessor (SMP) system, hardware may be designed to maintain this coherency. In some instances, though, software may be designed to assume responsibility of coherency. Coherency applies to the processor caches, the input (I/O) sub-system and graphics traffic. The programming model for a particular architecture determines precisely how the hardware must behave. A loosely coupled system may require that software guarantee that different processors which need to use the same piece of data are able to do so. For most SMP systems, hardware in the system may be designed to guarantee that a piece of data is updated to all processors if it is shared. For coherent data or code, there can exist only one valid version. There may be shared copies of this data or code, but all elements in the system must have the same version of the data. If the data is not coherent, then different elements may have different values for the identical address. Such may disadvantageously lead to the erroneous operations previously mentioned within the Background section of this disclosure.

A standard usage model to discuss coherency and ordering is the producer/consumer model. More particularly, in the producer/consumer model, one processor (the producer) is generating data and when completed writing all the data, updates a flag. The flag indicates to other processors that the data is now ready to be used for further calculations or updates. For instance, in a database, one user (the producer) may be writing in a record of a purchase which causes an inventory to decrement by the amount purchased. The next user (the consumer) must wait until the first update is complete or the same item could be sold twice. After the first user is finished with all updates, the flag is updated or a lock is released, and the second user can then proceed with data modified with the appropriate changes.

For the above scenario to work, the system must guarantee that when the second user reads the lock, and the flag or lock is free, then the data is guaranteed to be updated. If, for example, there was only one item in inventory and it's bought by the first user, the inventory should list 0. If the system allowed old data (in this case the value 1) to be read after the flag is updated, the second user would see an inventory of 1, instead of the correct 0, and possibly try to buy the same item. In the above FIG. 2 example, both processors P1 and P2 would contain redundant copies of the inventory, and may concurrently allow erroneous purchase of a same inventory item.

A next problem concerns memory write starvation. In the present disclosure, the term "write" is used generically/broadly to include both pure writes and also write-like requests/transactions (e.g., bus invalidate line (BIL), bus read invalidate line (BRIL) transactions; see 82460 GX materials mentioned ahead), as practice of the present invention is not limited to use with just pure write requests/transactions. Turning now to a write starvation example, in the FIG. 1 four processor system, assume that three processors (e.g., P1, P3 and P4) are all making repeated attempts to read a particular cache line, and assume that the fourth processor (e.g., P2) is trying to write to the same cache line. Such may occur, for example, in a case where the fourth processor is trying to write to set a register or flag to free up a resource, and the other three processors are polling the register or flag waiting for the resource to free up. A beat pattern may occur where one of those three reads is always queued (with ownership) or polling the resource when the write was issued, so the write would always keep getting retried. These three reads would just cycle through, so as soon as one of the reads is completed, one of the other two processors doing a read would get into the queue and the write would never happen. Such example is illustrated within FIG. 3.

Figure 3:
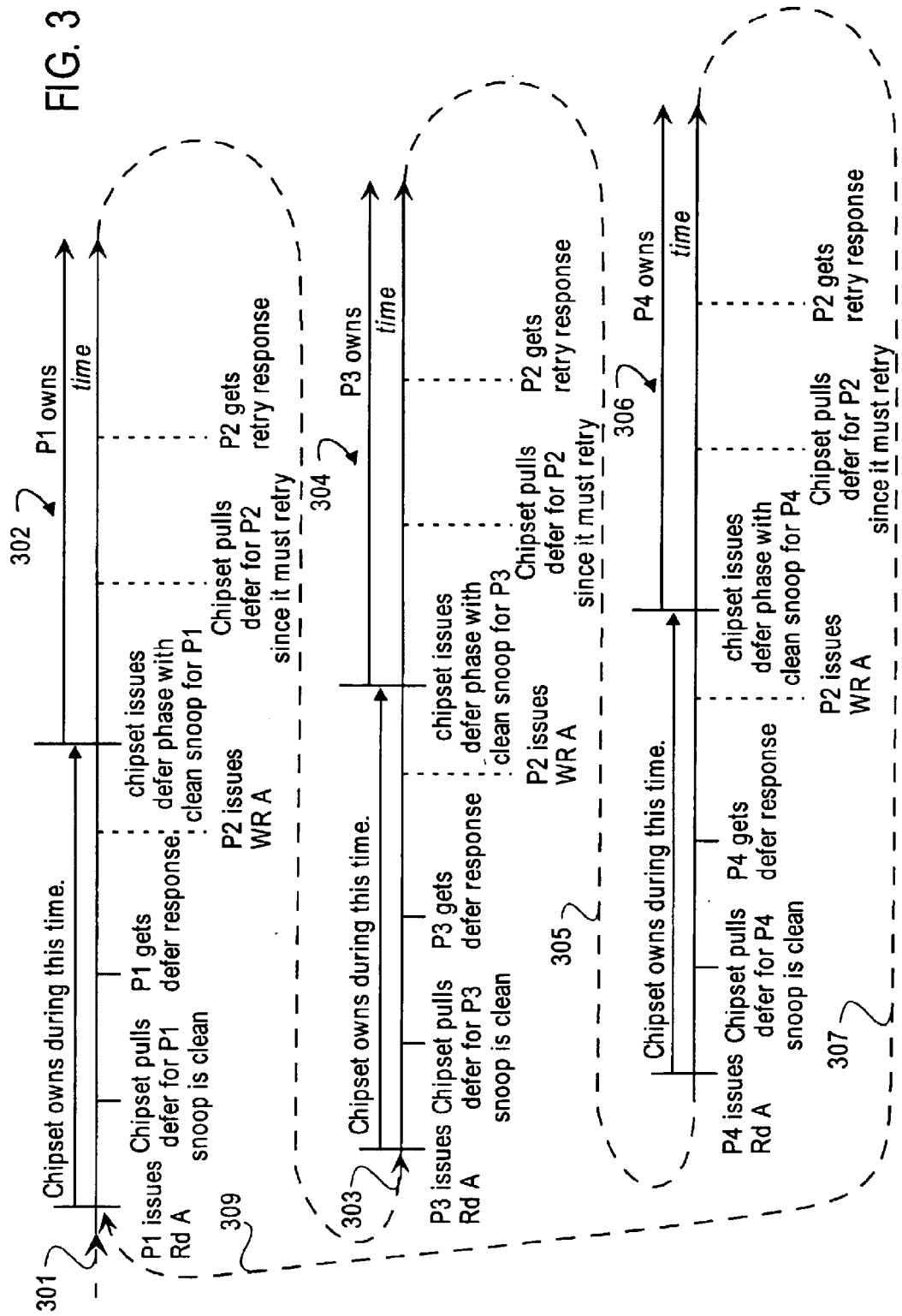
FIG. 3 is an example time line diagram illustrating an example of an occurrence of memory write starvation.

More particularly, FIG. 3 illustrates a situation where the FIG. 1 processors P1, P3 and P4 issue periodic read Rd A requests, while a processor P2 periodically attempts a write WR A. As can be seen by the FIG. 3 example, a looping beat pattern is set up (upon entering from a time-line portion 301) where: first a P1 processor gains ownership of the memory portion A in the timeline 302 and completes its operation (as shown representatively by dashed line 303) to return ownership back to the chipset, then the processor P3 gains ownership in the timeline 304 and completes its operation (as shown representatively by dashed line 305) to return ownership back to the chipset, and finally, the processor P4 gains ownership within the timeline 306 and completes its operation (as shown representatively by dashed line 307) to return ownership back to the chipset. In each of the timelines 302, 304 and 306, the processor P2 attempts a periodic write WR A, but each time the write is deferred/retried owing to a blocking real-time ownership by one of the other processors P1, P3 or P4. As can be seen, such situation repeats itself indefinitely as indicated by the short-dashed loop-back line 307 and circulating path in FIG. 3. That is, processor P2's write attempts effectively become blocked from being executed, whereupon the system enters a write starvation situation to effectively endlessly loop the system.

Figure 4:
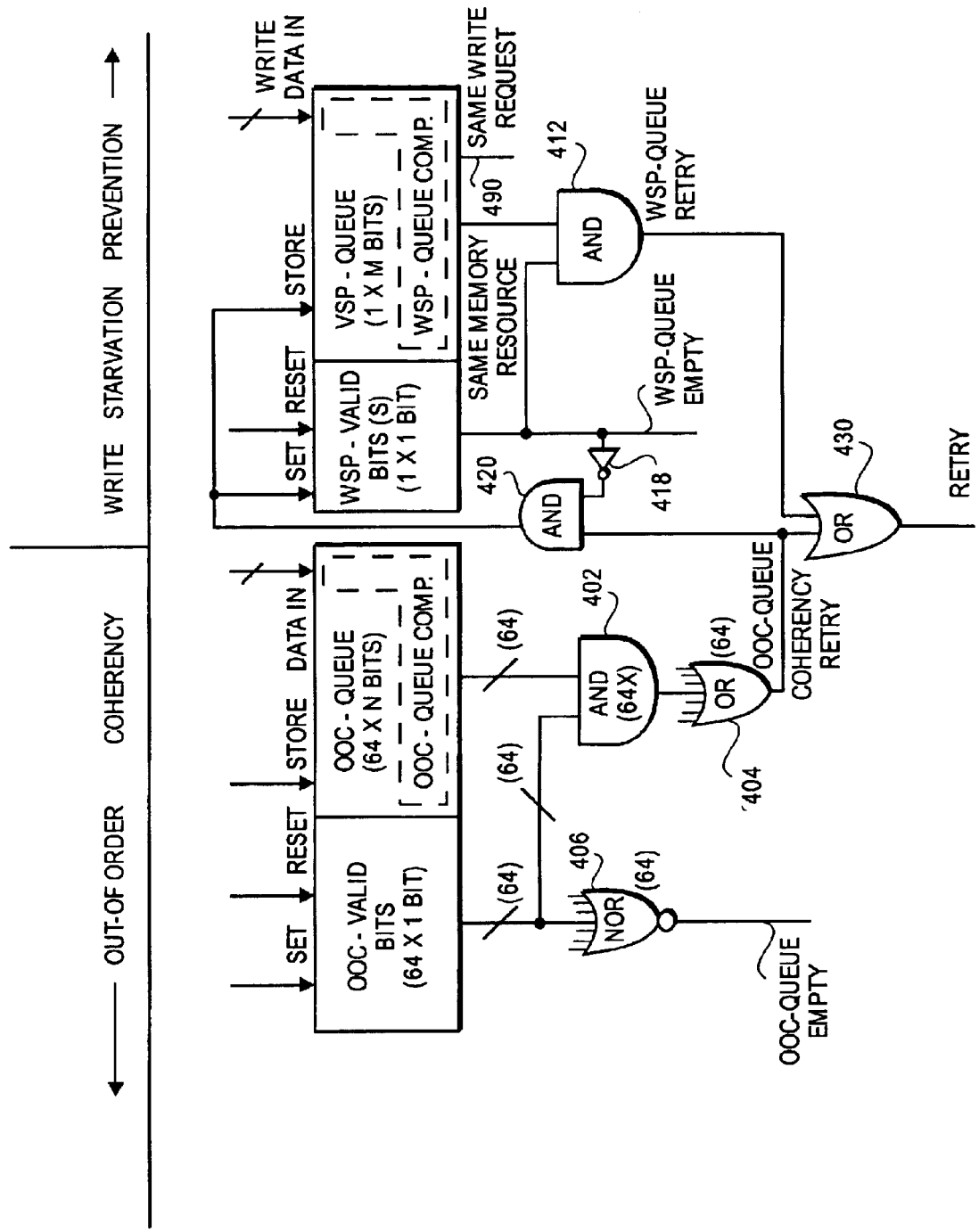
FIG. 4 is an example block diagram illustrating an example embodiment of the present invention, including example queue arrangements arranged to avoid cache incoherency and memory write starvation.

Although practice of the present invention is not limited thereto, the SAC within FIG. 1 may be adapted to contain arrangements for out-of-order cache coherency and memory write starvation prevention of the present invention, and FIG. 4 may illustrate example generic block diagrams of one such arrangement. Before moving to more detailed discussion, a high-level summary or synopsis is first provided.

More particularly, with respect to out-of-order coherency (OOC), Applicant's example embodiment contains an OOC queue/flag arrangement (see left-hand side of FIG. 4, for example; discussed ahead) which, in essence, allots ownership of memory resources (e.g., cache line) by maintaining a list of ownership as well as a flag indicative of the continued validity of (i.e., real-time) ownership of the resource. Applicant's example embodiment is further adapted to compare appropriate data from each incoming memory request to determine whether its targeted memory resource has a present ownership listing within an OOC-Queue registry, and also to determine whether any listed ownership continues to have a "valid" indication within an OOC-Valid registry. If the memory resource is found to already be owned and valid, the incoming request is simply retried. If the memory resource is found not to be included within the OOC-Queue registry's ownership list or not presently valid within the OOC-Valid registry, the request is allotted ownership by storage of appropriate data within the OOC-Queue registry and appropriate validation within an OOC-Valid registry.

Turning next to write starvation prevention (WSP), the example embodiment a WSP queue/flag arrangement which contains WSP-Queue and WSP-Valid registries somewhat similar to the OOC-Queue and OOC-Valid registries, respectively. More particularly, Applicant's example embodiment utilizes a write flag in order to flag the fact of an outstanding write request, so as to defer all subsequent requests attempting access of a same memory resource as the outstanding write request, i.e., so as to prevent memory write starvation. More particularly, when a write request comes in, and comparison within the OOC-Queue/OOC-Valid registries reveals that the memory resource requested by the write request is already owned within the OOC-Queue/OOC-Valid registries, appropriate data (e.g., which processor made the write request, which cache line address was the target of the request) and validation is latched into the WSP-Queue/WSP-Valid registries, and the write request is simply given a retry response.

Once such data/validation has been latched, such serves as an indication that all subsequent differing requests (reads or writes requesting the same memory resource as the L=outstanding write) should be retried until the write request has been cleared or de-validated with respect to the WSP-Queue and/or WSP-Valid registries (i.e., has been serviced/completed). Once the write request has been serviced/completed, then appropriate ones of the data/validation are cleared from the WSP-Queue and WSP-Valid registries, and the system goes back to normal operation. Accordingly, with the arrangement of the WSP-Queue/WSP-Valid registries, the write request is remembered until it is serviced/completed, and serves to block any requests to that same memory resource from any other requesting device, with all such requests being given a retry response.

If after being given a retry response, the same write request (as presently stored within the WSP-Queue/WSP-Valid registries) returns, and if the prior read request which had ownership is not yet completed (i.e., remains valid), the retrying write request is again given a retry response. That is, the write request can come back a second time and get retried, and in fact can come back multiple times and keep getting retried until the owning within the OOC-Queue and OOC-Valid registry is gone within the OOC-Queue/OOC-Valid registries is cleared or de-validated, the write request within the WSP-Queue/WSP-Valid registries is allowed to assert ownership. Such can be done by using the information stored within the WSP-Queue/WSP-Valid registries for ownership assertion (e.g., via further WSP ownership arrangements (e.g., logic); not shown in FIG. 4), or alternatively, appropriate information/validation regarding the write request's ownership could be loaded into the OOC-Queue/OOC-Valid registries.

It should be noted that the outstanding write request stored within the WSP-Queue/WSP-Valid registries will not block all read or write requests, but instead will only block (i.e., cause a retry response) read or write requests which request the same memory resource as the outstanding write request. If an incoming read or write request is for a differing memory resource (e.g., a differing cache line), such request is not blocked, but instead appropriate data/validity may be latched into the OOC-Queue/OOC-Valid registries to award ownership of the differing memory resource thereto.

Turning now to a discussion of greater details, attention is directed to FIG. 4. More particularly, FIG. 4 illustrates an example generic block diagram of an OOC arrangement on a left side thereof, and an example generic block diagram of a WSP arrangement on a right side thereof. Discussion turn first to the OOC arrangement.

More particularly, shown in block diagram form is an OOC-Queue registry being 64×N bits wide. More particularly, the 64 indicates that the OOC-Queue registry in this example can hold ownership listing information with respect to 64 different requests. Practice of the present invention is not limited thereto, and instead, a number of requests which should be accommodated depends upon an environment/platform in which the invention is practiced. Such members should be decided on a case-by-case basis, and as a general rule should accommodate a maximum expected number of requests expected to exist in real time in the OOC arrangement within the environment/platform.

The "N" bits corresponds to a minimum amount (e.g., bits) of information of interest with respect to the memory-owning requests. That is, such data should be sufficient, at minimum, to identify the memory resource which is owned, e.g., the address of the owned memory resource (e.g., the cache line address). Further, the OOC-Queue should also contain some type of information for identifying the request, e.g., a request identification (ID) number. Of course, practice of the present invention is not limited to inclusion of only this minimum information. Accordingly, the OOC-Queue may be of a register construction, for holding a listing of up to 64 of the most recent requests which have been granted ownership of a memory resource.

With regard to operation, upon an incoming request upon "Data In" lines, an OOC-Queue comparator (shown in dashed line representation) within the OOC-Queue registry compares appropriate information from the incoming request with each of the 64 OOC-Queue entries. Such may be done, for example, with a comparator-RAM (random access memory) arrangement (sometimes called a CAM). If a matching ownership is found, the OOC-Queue registry outputs an appropriate high or asserted signal along one of its 64 output lines, i.e., each output line matches one of entries within the OOC-Queue. If no match is found, the OOC-Queue outputs a low or de-asserted signal upon all of the 64 output lines.

In conjunction with the OOC-Queue registry is an OOC-Valid registry being of 64×1 bit size. Ones of the 64 entries within the OOC-Valid registry are made to correspond to ones of the entries within the OOC-Queue registry, e.g., by storing the OOC-Valid bits in one-to-one correspondence with the OOC-Queue entries, by a relational table, etc. The OOC-Valid registry also 64 output lines, again with each output line matching one of the entries within the registry. When appropriate information is first written within the OOC-Queue registry to allow memory resource ownership, a corresponding OOC-Valid bit is set (i.e., validated) using the OOC-Valid registry's "Set" input. Conversely, upon completion of an outstanding memory request, the corresponding OOC-Valid bit is reset (i.e., de-validated) using the OOC-Valid registry's "Reset" input.

As a result of the foregoing, it can be seen that the OOC-Queue/OOC-Valid registries contain information/validation with respect to memory requests having been allowed ownership of a memory resource, and that the OOC-Queue/OOC-Valid registries provide outputs pertaining to such information/validation along their respective output lines.

Each output of the 64 outputs of the OOC-Queue registry, and its corresponding output from the OOC-Valid registry, are fed to a differing two-input AND gate 402, i.e., there are a corresponding number of two-input AND gates as there are outputs from the OOC-Queue and OOC-Valid registries, such being 64 in the FIG. 4 example. Accordingly, if any high or asserted output from the OOC-Queue registry is indicative that the present requests requested memory resource has an "owned" listing within the OOC-Queue registry, and if the corresponding OOC-Valid output is indicative that owned listing of such memory resource is still valid, the corresponding AND gate 402 to which such signals are fed will have a high or asserted output which indicates that the requested memory resource is presently "owned". At any given time, only one of the 64 AND gates 402 should have a high or asserted output therefrom (unless the OOC and WSP arrangements use a common queue/valid registries as discussed ahead).

The 64 outputs from the 64 AND gates 402 are fed to a 64 input OR gate 404. Accordingly, during any times when any one of the 64 AND gates 402 outputs a high or asserted signal, the OR gate 404 will likewise output a high or asserted "OOC-Queue Coherency Retry" signal. Such effectively represents an indication that the present requested memory source is already owned, and that the present request for such memory resource should be given a retry response. The high or asserted signal from the OR gate 404 may feed forward through the OR gate 430, to effectively become a more universal "Retry" signal. (In addition to a high or asserted signal from the OR gate 404 traversing through the OR gate 430 representing a "retry" signal, a high or asserted output from an AND gate 412 of a WSP arrangement (discussed ahead) and traversing through the OR gate 430 can likewise represent a "retry" signal.) Such retry signal could be fed back throughout the system (e.g., via appropriate paths, logic, etc.) to inform the appropriate components of the retry response, and permit storage of the request into the OOC arrangement.

If a present request at the Data In input of the OOC-Queue is not "owned", then differing operations are conducted. More particularly, either through the absence of any matching data within the OOC-Queue registry, or through absence of a high or asserted validity bit within the OOC-Valid registry, all of the 64 AND gates 402 will be outputting a low or de-asserted signal so as to cause the OR gate 404 likewise to output a low or de-asserted signal. Such signal from the OR gate 404 is fed to the OR gate 430, and unless another input to the OR gate 430 is high or asserted, the output from the OR gate 430 will be low or de-asserted. Upon the indication from the OR gate 430 that the requested memory resource is not owned, appropriate feedback of such signal (using appropriate paths, logic, etc.) may be made to the "Store" input of the OOC-Queue registry and to the "Set" input of the OOC-Valid registry, to cause appropriate storage of information/validity within the OOC-Queue and OOC-Valid registries to allow memory resource ownership for the request.

While the OOC arrangement will cause a retry and deny storage upon any memory resource match, it is worthy to note that the system may be designed to allow the device granted ownership of the memory resource, to effect sharing of the owned memory resource where appropriate (e.g., two read requests may be appropriate for sharing since the reads will not alter the contents of the memory resource). In sharing situations, the owning device may detect that another device's request is designating access of the owned memory resource, and responsive to the detection, the owning device may respond (e.g., with a HIT signal) effecting sharing.

Upon completion of the request (e.g., via appropriate system signals which are not a subject of this disclosure), the "Reset" input of the OOC-Valid registry can be used to reset the OOC-Valid bit corresponding to the completed request so as to de-assert ownership and free up the memory resource for subsequent requests. Of course, additional identifying information (e.g., request identification number) must also be provided by the system and applied to the OOC registries (e.g., via the Data In lines) to ensure that the appropriate valid bit corresponding to the completed request is de-validated.

As to storage of information/validity within the OOC-Queue/OOC-Valid registries, until all of the registers therein have been completely used at least once, storage may be made within any one of their empty registers. Alternatively, or once all registers have been completely used at least once, the OOC-Queue/OOC-Valid registries could have arrangements (not shown) which monitor the OOC-Valid bits to determine which entries no longer have valid ownership, so as to determine which registers can be reused/overwritten.

In addition to the above-described operations/arrangements, there may be times when it is useful for a system to know whether there any pending valid ownership listings remaining within the OOC arrangement. For example, the system may be waiting to perform some type of management (e.g., a FLUSH) operation requiring that no "owning" requests still be outstanding. In order to accommodate the function of knowing whether there are any outstanding ownership listings remaining, in one example arrangement, all of the 64 outputs from the OOC-Valid registry could be fed to a 64 input NOR gate 406. Thus, upon the condition where none of the OOC-Valid bits are valid, all of the 64 outputs would be at a low or de-asserted signal level, thereby causing a high or asserted "OOC-Queue empty" signal to appear on the output of the NOR gate 406. Any arrangement interested in whether there are any outstanding ownership listings, could simply monitor this OOC-Queue empty signal from the NOR gate 406 (e.g., via appropriate data paths, logic, etc.; now shown).

Figure 5:
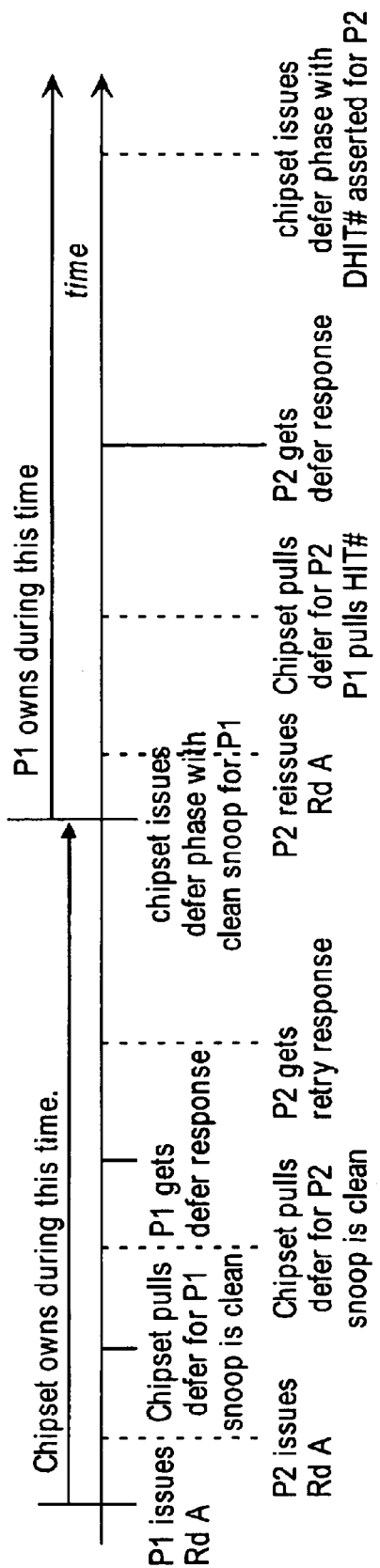
FIG. 5 is an example time-line diagram illustrating an example sequence of the FIG. 4 arrangement, which avoids cache incoherency.

Discussion now turns to FIG. 5 which represents an example time-line explaining ones of the operations of the FIG. 4 OOC arrangement. More particularly, in FIG. 5, initially the SAC/SDC chipset has ownership of the memory resource A. In reading the FIG. 2 time-line diagram from left to right, at some predetermined time, first P1 issues a Rd A request, and shortly thereafter, P2 issues a similar Rd A request. The chipset then pulls a defer for P1, and a snoop of the system reveals no ownership of the memory resource A outside of the chipset. Shortly thereafter, the chipset performs similar operations with respect to P2. P1 then gets a defer response and appropriate ownership information with respect to P1's Rd A request is stored within the OOC-Queue/OOC-Valid registries. P2 gets a retry response. Shortly thereafter, the chipset issues a defer phase with a clean snoop for P1, with P1 gaining ownership thereafter (i.e, until the Rd A request is completed). A short time thereafter, P2 (responsive to the received retry response) reissues the Rd A request. The chipset, upon processing the P2 Rd A request, pulls a defer for P2, and the P1 processor, likewise processing P2's Rd A request, pulls a HIT# to indicate that it has ownership of the memory resource A. Thereafter, P2 gets a defer response. Finally, the chipset issues a defer phase with a DHIT# asserted for P2.

Accordingly, from FIG. 5, it can be seen that the P1's Rd A request first arriving at the chipset is granted ownership of the memory resource A. P2's subsequent Rd A requests are differed or retried until such a time as P1's Rd A request is completed, and P1's ownership of the memory resource A is de-validated within the OOC-Queue/OOC-Valid registries. P2 can thereafter gain ownership at such a time when information/validity with respect to one of its reissued Rd A requests is stored into the OOC-Queue/OOC-Valid registries (that is, if there is no outstanding write request's "reserved future ownership" presently existing within a WSP arrangement; discussed ahead).

Discussion turns next to a right-hand or WSP portion of FIG. 4, in conjunction with the OOC portion. More particularly, assuming that a write request is at the Data In terminals of the OOC-Queue/OOC-Valid registries, if the memory resource (e.g., memory resource A) requested by the write request is found within the OOC-Queue/OOC-Valid registries as already having valid ownership, a high or asserted OOC-Queue Coherency Retry signal will be output from the OR gate 404 and travel through the OR gate 430 to represent a retry response to the write request. Unless a special arrangement (beyond the OOC arrangement) is provided, a disadvantageous beat pattern like that of the previously discussed FIG. 3 could effectively block the write request to result in write starvation. A right-hand portion of FIG. 4 represents an example WSP arrangement.

More particularly, the block diagram representations of the WSP-Queue/WSP-Valid registries are similar to the previously discussed OOC-Queue/OOC-Valid registries, respectively, so only differences therefrom will be discussed for sake of brevity. More specifically, the WSP-Queue registry may differ from the OOC-Queue registry in at least two regards. More particularly, in the FIG. 4 WSP example arrangement, the WSP-Queue registry contains storage for only one request entry as opposed to the 64 provided for the OOC-Queue registry. The WSP-Queue registry was limited to one request entry for the reasons that a one-entry registry was found to provide adequate WSP protection, and further so as to minimize a complexity/cost of the system. Of course, practice of the present invention is not limited to a one-entry WSP-Queue registry, and instead, any number of entries could be provided.

As a second difference, the WSP-Queue entry may contain "M" bits as opposed to the "N" bits of the OOC-Queue. That is, it may be desirable for the WSP-Queue registry to store differing information than that stored within the OOC-Queue registry. For example, it may be useful to store information as to which processor had issued the write request, which memory resource (e.g., cache line address) to which the write request is directed, as well as other management-type information (e.g., a priority level of the write request, etc.).

Turning next to the WSP-Valid registry, such differs from the OOC-Valid registry in only having one entry as opposed to the 64 of the OOC-Valid registry, i.e., for similar reasons as those set forth for the WSP-Queue registry.

Operation of the FIG. 4 WSP arrangement will now be described. More particularly, first assume that there is either no write request stored within the WSP-Queue registry or that the WSP-Valid bit has been de-validated, i.e., assume that there is no outstanding write request stored within the WSP-Queue/WSP-Valid registries. Accordingly, if a memory resource requesed by an incoming write request already has a valid ownership outstanding within the OOC-Queue/OOC-Valid registries, then the high or asserted OOC-Queue Coherency Retry signal from the OR gate 404 will be applied to one input of an AND gate 420. As a second input to the AND gate, since the single valid bit within the WSP-Valid registry is de-validated (based upon the above assumption) as there is presently no outstanding write request, the low or de-asserted output signal along the single output line of the WSP-Valid registry, will be inverted by the invertor 418 to thereafter apply a high or asserted signal to the second input of the AND gate 420. The AND gate 420, thus having two high or asserted inputs, will output a high or asserted signal which is fed forward (using appropriate path and logic) to the "Store" and "Set" input terminals of the WSP-Queue/WSP-Valid registries. The write request appearing at the OOC-Queue's data in terminal likewise is applied to the WSP-Q's Write Data In Terminals, and as a result of the high or asserted signal applied to the Store and Set terminals, appropriate information/validity with respect to the write request is latched into the WSP-Queue/WSP-Valid registers. Accordingly, at this point, appropriate data/validity has been written into the WSP-Queue and the WSP-Valid registers so as to "reserve future ownership" of the memory resource for the write request. At this point, it is worthy to note that any valid/listed ownerships within the OOC arrangement and any valid/listed "reserved future ownership" within the WSP arrangement can both be generically called "ownership reservations" in the sense that ownership of a memory resource has been reserved.

Assume next that a subsequent request (read or write) attempting to access the same memory resource (e.g., memory resource A) as the stored write request, is applied to the OOC-Queue and WSP-Queue arrangements. If memory resource A still has a validated ownership listing within the OOC-Queue/OOC-Valid registries, such arrangements will invoke a retry signal through the OR gate 430 as was previously discussed. If, however, memory resource A does not have a validated ownership listing within the OOC-Queue/OOC-Valid registries, the WSP arrangement will nevertheless invoke a retry signal through the OR gate 430 as follows, responsive to having a "reserved future ownership" listing within the WSP-Queue/WSP-Valid registries.

More particularly, the write request for the same memory resource as the previously stored write request will result in a positive comparison by the WSP-Queue comparator (shown in dashed-line representation) to result in a high or asserted output signal from the WSP-Queue registry. Such high or asserted signal is applied to one input of the AND gate 412. As a second input to the AND gate, the singular WSP-Valid bit will be valid to cause the WSP-Valid registry to output a high or asserted signal along the single output line thereof, with such high or asserted signal being applied to the second input of the AND gate 412. With the two inputs of the AND gate 412 being high or asserted, the AND gate 412 outputs a high or asserted "WSP-Queue Retry Signal" at the output thereof. Such signal travels through the OR gate 430 to result in a high or asserted Retry signal at the output thereof. Again, as mentioned previously, such retry signal could be fed back throughout the system, e.g., via appropriate paths, logic, etc.) to inform the appropriate components of the retry response, and permit storage of the request into the OOC arrangement.

Figure 6A:
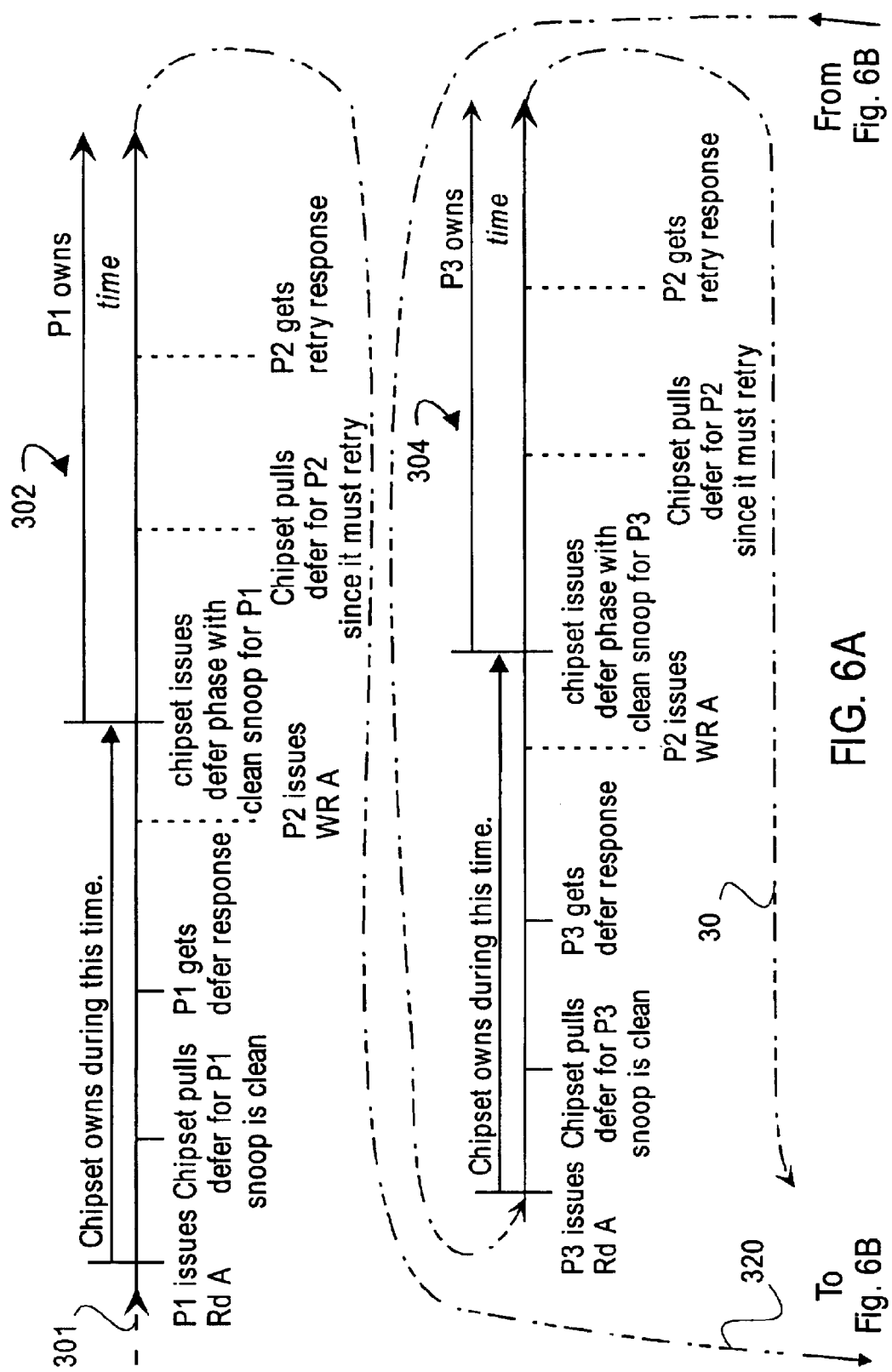
FIG. 6 is an example time-line diagram illustrating an example sequence of the FIG. 4 arrangement, which avoids memory write starvation.
Figure 6B:
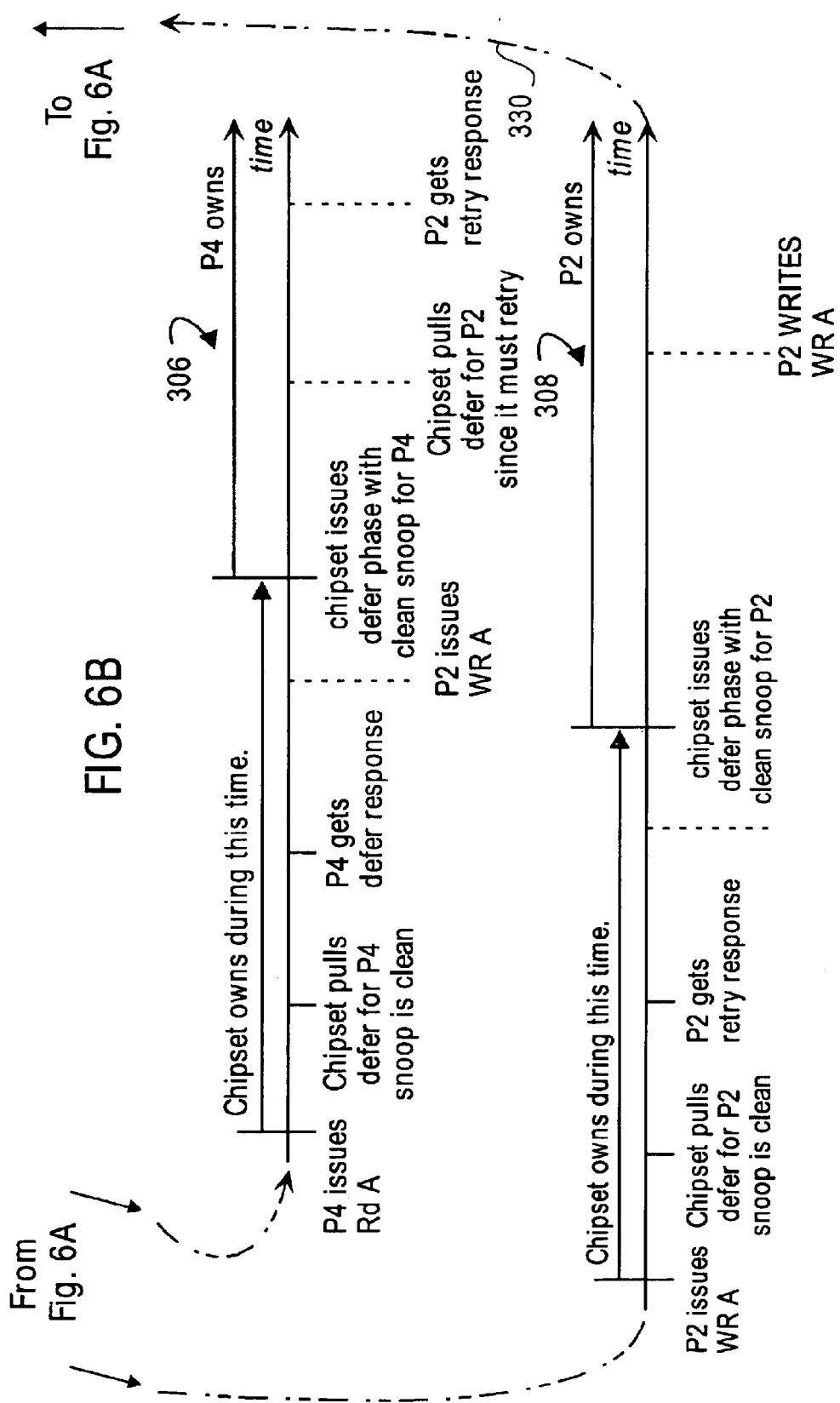

Accordingly, as shown in the FIG. 6 time-line illustration, once P1's original RD A read request (FIG. 6 time-line 302) in the OOC-Queue/OOC-Valid registries no longer has a validated ownership listing, no other requests (other than the stored write request within the WSP-Queue and WSP-Valid registries) is granted ownership, and instead, such requests are deffered/retried (represented by long/short-dashed line 320). Instead, the P2 processor having the "reserved future ownership" within the WSP-Queue/WSP-Valid registries is granted ownership as shown in the time-line 308. Once completed, the write request within the WSP-Queue/WSP-Valid registries have a valid ownership listing de-validated, to return to a normal operation (represented by long/short-dashed line 330) to award ownership to P3 and then P4 as indicated by the time-lines 304 and 306, respectively.

In addition to the above-discussed WSP arrangements, an additional WSP arrangement may be used to prevent a reissued write request from getting a retry response in the event that prior blocking OOC ownership has been cleared/de-validated, and the reissued write request is again applied to the WSP registries. That is, a reissued write request appearing at the WSP-Queue's Write Data In terminals may match the write request having reserved ownership within the WSP registries, i.e., if it is the same memory request from the same source (e.g., processor). The WSP registries, and in particular, the WSP-Queue may be endowed with an additional arrangement which compares identifying information (e.g., request ID number) between the reissued write request and the WSP-stored write request, and which outputs an appropriate "Same Write Request" signal on line 490. The Same Write Request signal can be indicative of whether or not a match is found. Alternatively, an arrangement (e.g., logic; not shown in FIG. 4) could be provided outside of the WSP registries to perform comparison and output the result. The Same Write Request signal may be used (e.g., via appropriate communication paths, logic, etc.; not shown in FIG. 4) to prevent a retry response from being initiated by the WSP registries. For example, a normally high or asserted signal along line 490 may be made indicative of no write match, and be applied as a third input to the AND gate 412 to normally enable the same and enable generation of Retry signals. Conversely, a low or de-asserted level along the line 490 may be made indicative of a write match, and disable the AND gate 412 and generation of Retry signals.

Figure 7:
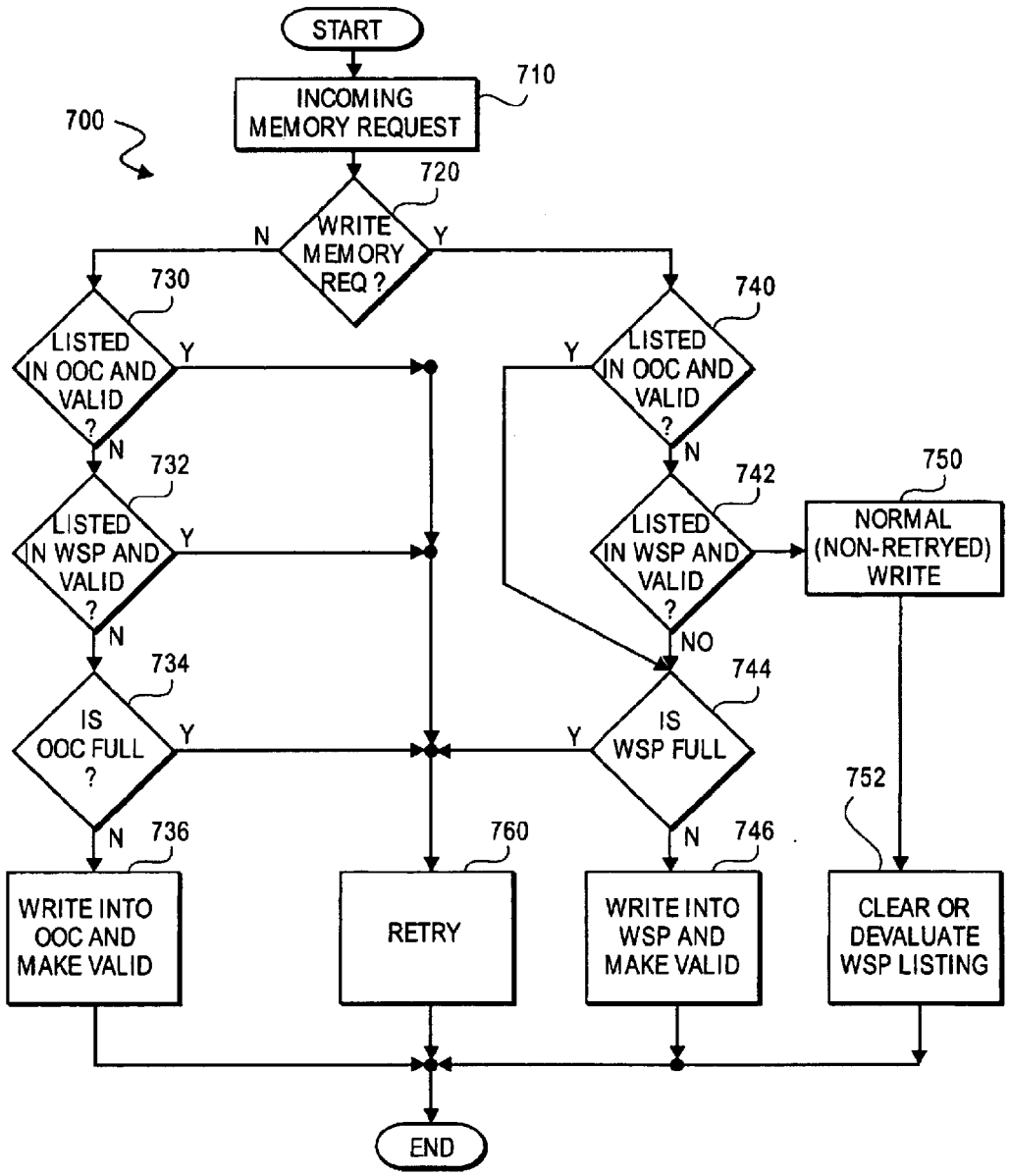
FIG. 7 is an example flow diagram of an example operation of the FIG. 4 arrangement, arranged to attempt to avoid cache incoherency and memory write starvation.

The FIG. 7 flowchart is a flowchart summary of example operations 700 of the FIG. 4 arrangments. After "Start", block 710 represents an incoming memory request. In block 720, it is decided whether the memory is a write memory request. If no, flow proceeds to the left-hand portion of FIG. 7, i.e., proceeds first to block 730 where it is decided whether the memory resource requested by the incoming request already has valid ownership within the OOC-Queue/OOC-Valid registries. If Yes, i.e., if valid ownership exists, flow proceeds to block 760 where a retry response is given, and then flow moves to End to end processing with respect to that incoming request. If No, flow proceeds from block 730 to block 732 where it is decided whether the memory resource requested by the incoming request has a valid "reserved future ownership" in the WSP-Queue/WSP-Valid registries. If Yes, i.e., if valid reserved future ownership exists, flow proceeds to block 760 where a retry response is given, and then flow moves to End to end processing with respect to that incoming request. If No, flow proceeds from block 732 to block 734 where it is decided whether the OOC-Queue/OOC-Valid registries are full. If Yes, i.e., if full, flow proceeds to block 760 where a retry response is given, and then flow moves to End to end processing with respect to that incoming request. If No, flow proceeds from block 734 to block 736 where appropriate information/validity are loaded into the OOC-Queue/OOC-Valid registries to list/allow ownership. Flow then moves to End to end processing with respect to that incoming request.

If in block 720, it is decided that the incoming memory request is a write memory request, flow proceeds to the right-hand portion of FIG. 7, i.e., proceeds first to block 740 where it is decided whether the memory resource requested by the incoming write request already has valid ownership within the OOC-Queue/OOC-Valid registries. If Yes, i.e., if valid ownership exists, flow proceeds to block 744 (discussed ahead). If No, flow proceeds from block 740 to block 742 where it is decided whether the memory resource requested by the incoming write request is the same write request (e.g., from the same processor, having a same request ID number) as the prior write request having the valid "reserved future ownership" in the WSP-Queue/WSP-Valid registries. If Yes, flow proceeds to block 750 where a normal write operation is performed, then block 752 where the information/validity within the WSP-Queue/WSP-Valid registries are appropriately treated to clear the write request therein. If No, flow proceeds from block 742 to block 744 where it is decided whether the WSP-Queue/WSP-Valid registries are full. If Yes, i.e., if full, flow proceeds to block 760 where a retry response is given, and then flow moves to End to end processing with respect to that incoming request. If No, flow proceeds from block 744 to block 746 where appropriate information/validity are loaded into the WSP-Queue/WSP-Valid registries to list/reserve future ownership. Flow then moves to End to end processing with respect to that incoming request.

Figure 8:
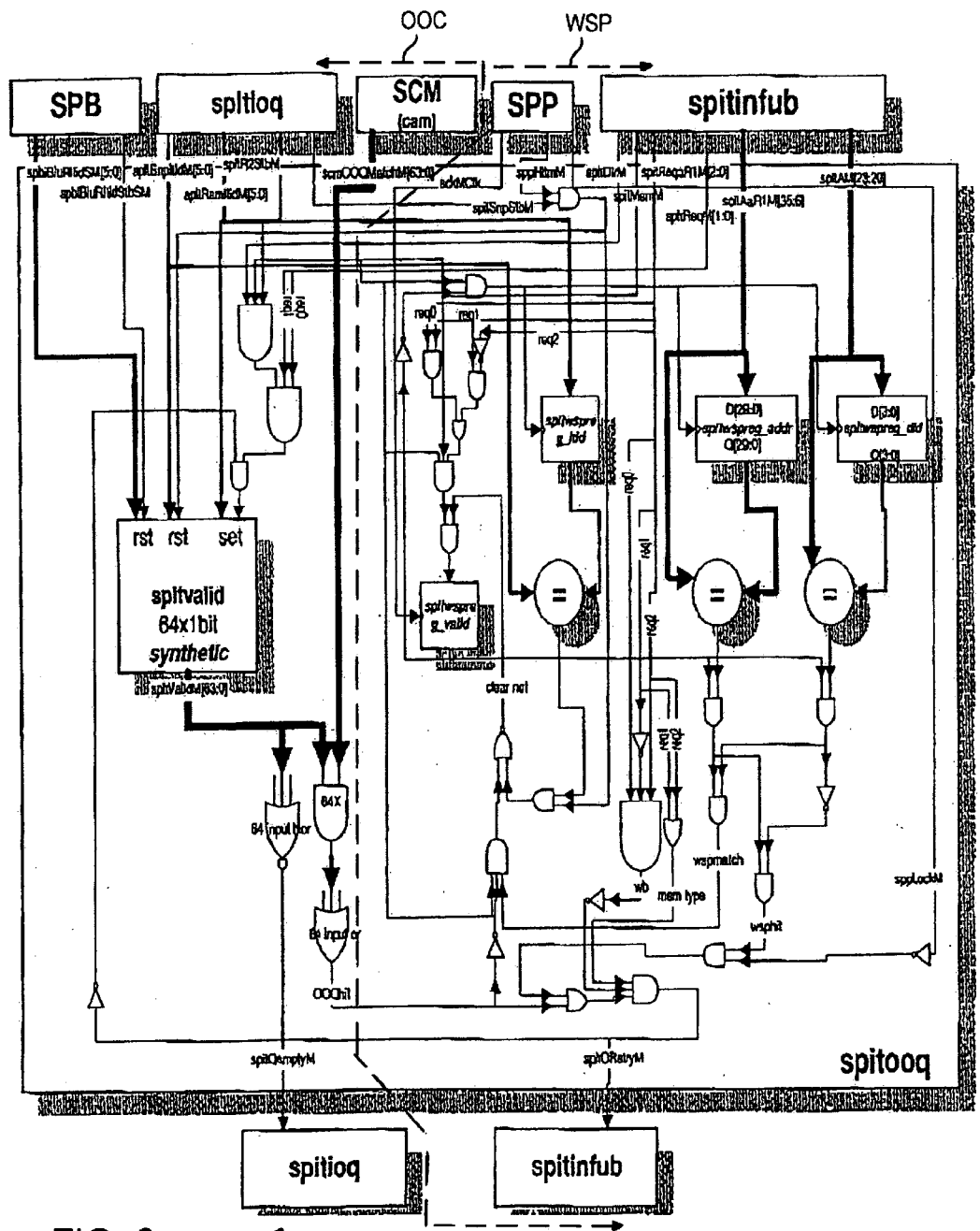
FIG. 8 is an example circuit/block-diagram implementation of the present invention within an SAC chip.

FIG. 8 illustrates another example implementation of the present invention, in greater detail. More particularly, FIG. 8 is a block/circuit diagram extracted from 82460GX chipset publications published by Intel Corporation of Santa Clara, Calif. In essence, left-hand portions of such FIG. to the left of the short-dashed dividing line generally represent an OOC arrangement, whereas right-hand portions generally represent a WSP arrangement. A more detailed understanding of the operation of such example embodiment can be gained by accessing the aforementioned 82460 GX chipset publications. Since operations/arrangements of the FIG. 8 block/circuit diagram is particular to the example 82460GX environment described in these publications, and since discussion thereof might cloud an understanding of the invention, detailed discussion of FIG. 8's particularized detail thereof is omitted for sake of brevity/clarity.

This concludes the description of the preferred embodiments. Although the present invention has been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

While the FIG. 4 (and FIG. 8) example embodiment illustrate the OOC and WSP arrangements being provided as separate arrangements, practice of the present invention is not limited thereto. More particularly, the OOC and WSP arrangements could be combined into a single queue. As one possible adaptation to allow both OOC ownerships and WSP "reserved future ownerships" to be stored within a single queue, an additional designation bit or bits could be associated with each respective listing within the single queue, and could be used to designate whether the listing was for an OOC ownership or a WSP reserved future ownership. Note then, that an OOC ownership and a WSP reserved future ownership for a same memory resource could concurrently exist within the single queue, e.g., if a write request for the same memory resource is listed before the listing for a prior request is completed and de-validated within the single queue. If such situation occurs, the prior OOC ownership listing for the same memory resource could simply be de-validated upon request completion, and the designation bit or bits could (with the help of additional logic; not shown) then simply be changed to convert the WSP reserved future ownership listing into a normal OOC ownership listing.

Further, while the FIG. 4 (and FIG. 8) example embodiment illustrate two specific queues, i.e., the OOC and WSP arrangements, practice of the present invention is not limited thereto. More particularly, additional queue arrangements could be added beyond the OOC and WSP arrangements. For example, if the FIG. 1 example system supported FLUSH requests (for temporarily inhibiting additional memory resource ownerships, and allowing all existing/outstanding ownerships to be completed and cleared), a FLUSH arrangement could also be provided. Alternatively, differing specific arrangements besides the OOC/WSP could be practiced. For example, an OOC/FLUSH arrangement could be practiced if OOC and FLUSH were system concerns, but WSP was not.

Still further, embodiments of the present invention could be implemented entirely in hardware (for higher speed) or entirely in software (for higher changeability/versatility), or any hardware/software compromise.

What is claimed is:

1. A retry device comprising:

a queue arrangement adapted to store ownership reservations for requests which designate access of a memory resource, a comparator arrangement adapted to compare a designated memory resource of any incoming request with any said ownership reservations stored in said queue arrangement, to determine whether a valid ownership reservation is outstanding for the designated said memory resource;

a retry arrangement adapted to generate a retry response for said incoming request, in an event said comparator arrangement determines valid ownership reservation is outstanding; and a queue-store arrangement adapted to effect storage of an ownership reservation of the designated said memory resource in said queue arrangement, in an event said comparator arrangement determines valid ownership reservation is not outstanding.

2. A retry device as claimed in claim 1, wherein said queue arrangement comprises at least one of an out-of-order coherency (OOC) queue to store said ownership reservations for OOC requests which designate access of a memory resource, and a write-starvation-protection (WSP) queue to store said ownership reservations for OOC write requests which designate access of a memory resource.

3. A retry device as claimed in claim 2, wherein said queue arrangement comprises both said OOC queue and said WSP queue.

4. A retry device as claimed in claim 3, wherein said OOC queue and said WSP queue are provided as separate queues.

5. A retry device as claimed in claim 1, wherein said queue arrangement comprises a plurality of registers for storing ownership reservations for a plurality of said requests, and includes a separate validity flag for each register for flagging continued validity of an ownership reservation stored within said register.

6. A retry device comprising:

queue means for storing ownership reservations for requests which designate access of a memory resource, comparator means for comparing a designated memory resource of any incoming request with any said ownership reservations stored in said queue means, to determine whether a valid ownership reservation is outstanding for the designated said memory resource;

retry means for generating a retry response for said incoming request, in an event said comparator means determines valid ownership reservation is outstanding; and queue-store means for effecting storage of an ownership reservation of the designated said memory resource in said queue means, in an event said comparator means determines valid ownership reservation is not outstanding.

7. A retry device as claimed in claim 6, wherein said queue means comprises at least one of: out-of-order coherency (OOC) queue means for storing said ownership reservations for OOC requests which designate access of a memory resource, and a write-starvation-protection (WSP) queue means for storing said ownership reservations for OOC write requests which designate access of a memory resource.

8. A retry device as claimed in claim 7, wherein said queue means comprises both said OOC queue means and said WSP queue means.

9. A retry device as claimed in claim 8, wherein said OOC queue means and said WSP queue means are provided as separate queues.

10. A retry device as claimed in claim 6, wherein said queue means comprises a plurality of registers for storing ownership reservations for a plurality of said requests, and includes a separate validity flag for each register for flagging continued validity of an ownership reservation stored within said register.

11. A system comprising:
   a retry device comprising:
      a queue arrangement adapted to store ownership reservations for requests which designate access of a memory resource;
      a comparator arrangement adapted to compare a designated memory resource of any incoming request with any said ownership reservations stored in said queue arrangement, to determine whether a valid ownership reservation is outstanding for the designated said memory resource;
      a retry arrangement adapted to generate a retry response for said incoming request, in an event said comparator arrangement determines valid ownership reservation is outstanding; and
      a queue-store arrangement adapted to effect storage of an ownership reservation of the designated said memory resource in said queue arrangement, in an event said comparator arrangement determines valid ownership reservation is not outstanding.

12. A system as claimed in claim 11, wherein said queue arrangement comprises at least one of: an out-of-order coherency (OOC) queue to store said ownership reservations for OOC requests which designate access of a memory resource, and a write-starvation-protection (WSP) queue to store said ownership reservations for OOC write requests which designate access of a memory resource.

13. A system as claimed in claim 12, wherein said queue arrangement comprises both said OOC queue and said WSP queue.

14. A system as claimed in claim 13, wherein said OOC queue and said WSP queue are provided as separate queues.

15. A system as claimed in claim 11, wherein said queue arrangement comprises a plurality of registers for storing ownership reservations for a plurality of said requests, and includes a separate validity flag for each register for flagging continued validity of an ownership reservation stored within said register.

16. A retry method comprising:
   storing ownership reservations for requests which designate access of a memory resource, an a queue arrangement;
   comparing a designated memory resource of any incoming request with any said ownership reservations stored in said queue arrangement, to determine whether a valid ownership reservation is outstanding for the designated said memory resource, using a comparator arrangement;
   generating a retry response for said incoming request, in an event said comparing determines valid ownership reservation is outstanding, using a retry arrangement; and
   storing an ownership reservation of the designated said memory resource in said queue arrangement, in an event said comparing determines valid ownership reservation is not outstanding.

* * * * *

UNITED STATES PATENT AND TRADEMARK OFFICE
CERTIFICATE OF CORRECTION

PATENT NO. : 6,738,869 B1 Page 1 of 1
DATED : May 18, 2004
INVENTOR(S) : Moran et al.

It is certified that error appears in the above-identified patent and that said Letters Patent is hereby corrected as shown below:

Column 1,
Lines 14-15, delete "(see FIG1, e.g. described ahead)".

Column 2,
Line 1, delete "an example" and insert -- a --.

Column 3,
Line 61, delete "PI" and insert -- P1 --.

Column 6,
Line 16, delete "L=".
Lines 36-37, delete "registry is gone within the OOC-Queue/OOC-Valid".

Column 16,
Line 25, delete "an" and insert -- in --.

Signed and Sealed this

Twenty-fourth Day of August, 2004

JON W. DUDAS
*Director of the United States Patent and Trademark Office*